United States Patent [19]

Turner

[11] Patent Number: 4,538,135
[45] Date of Patent: Aug. 27, 1985

[54] VEHICULAR SECURITY SYSTEM

[75] Inventor: Earl W. Turner, Brockton, Mass.

[73] Assignee: Audiovox Corp., Hauppauge, N.Y.

[21] Appl. No.: 396,716

[22] Filed: Jul. 9, 1982

[51] Int. Cl.$^3$ .................. B60R 25/00; E05B 65/19
[52] U.S. Cl. ................................. 340/63; 340/64; 340/65; 70/241
[58] Field of Search .......... 307/10 AT; 292/DIG. 14; 70/1.5, 240, 241; 340/63, 64, 65

[56] References Cited

U.S. PATENT DOCUMENTS

| | | | |
|---|---|---|---|
| 3,010,531 | 11/1961 | Flora | 307/10 AT |
| 3,538,725 | 11/1970 | Guenther et al. | |
| 3,710,317 | 1/1973 | Colsen et al. | 340/64 |
| 4,102,164 | 7/1978 | Barbush | 70/241 |
| 4,150,731 | 4/1979 | Tannenbaum | 307/10 AT X |

Primary Examiner—John W. Caldwell, Sr.
Assistant Examiner—E. G. Harding, Jr.
Attorney, Agent, or Firm—Jacobs & Jacobs

[57] ABSTRACT

A security system for a vehicle having an engine compartment covered by a hood, and an ignition switch for operating the engine, includes a common housing for protecting a hood lock and an ignition lock switch. An electric circuit is provided for shorting an ignition coil during periods of non-use of the vehicle to prevent theft of the vehicle, the circuit being disarmed by the lock switch for a sufficient interval of time to permit use of the ignition switch for starting the engine. A lock-up feature within the circuit maintains the circuit in the disarmed state during operation of the vehicle, and automatically rearms the circuit upon retrieval of the ignition key.

14 Claims, 4 Drawing Figures

VEHICULAR SECURITY SYSTEM

BACKGROUND OF THE INVENTION

This invention relates to vehicular security systems and, more particularly, to a system employing a common tamperproof housing for an engine compartment lock and for a switch which operates a circuit for disabling the ignition, the disabling circuit being automatically activated.

The theft of motor vehicles, and particularly of automobiles, has reached epidemic stages throughout the country. Various devices have been suggested for discouraging the theft, and for making such theft ever more difficult.

One such security device, described in U.S. Pat. No. 3,538,725, combines an electrical switch and a Bowden cable for simultaneous grounding of the ignition coil of the engine ignition system while locking the hood of the engine compartment. Unfortunately, the foregoing device is disadvantageous in that it requires the driver of the car to set the security lock before leaving the car. Such a security device requires the active participation of the driver in order to ensure that the motor vehicle has been secured. Ideally, a passive system wherein the vehicle is secured without any action on the part of the driver would be most desirable since a large proportion of all thefts occur in those situations wherein the driver has forgotten to secure the vehicle.

A further disadvantage with the foregoing security device, as well as other such devices, is found in the simultaneous locking of both the hood of the engine compartment as well as the disabling of the engine ignition circuit. Generally, there is no need to unlock a hood, except for maintenance purposes. Thus, in such active systems requiring the act and participation of the driver, both the hood and the ignition circuit are available for tampering by a would-be thief in the situation wherein the driver has forgotten to lock the security device.

SUMMARY OF THE INVENTION

The aforementioned problem is overcome and other advantages are provided by a vehicular security system wherein a Bowden type of cable lock and an electrical switch lock are contained within a tamperproof housing mounted on or beneath the dash of the motor vehicle. A single tubular key is used to unlock either or both of the foregoing locks. The cable lock, upon rotation of the key, is reciprocally movable for advancing and retracting the cable so as to engage or disengage the hood lock.

The electrical-switch lock is to be operated in addition to the standard ignition lock, the electrical-switch lock being operated momentarily to activate an ignition lock-up circuit which permits the use of the standard ignition key in starting the engine and in running the engine. The lock-up circuit is disengaged after a delay of one-half minute to one minute upon the turning off of the ignition with the standard ignition key. The foregoing delay permits restarting of the engine in the event of accidental stalling in traffic without the need for unlocking the security system, a delay of 40 seconds being used in a preferred embodiment of the invention. Thus, the security system of the invention is of the passive type in that it does not require any active participation by the driver of the vehicle. The housing also contains a lamp showing that the security system has been enabled to permit the starting and running of the engine. A fail-safe switch is also provided for bypassing the security circuit in the event of a failure thereof, so as to permit the operation of the motor vehicle.

BRIEF DESCRIPTION OF THE DRAWINGS

The foregoing aspects and other features of the invention are explained in the following description taken in connection with the accompanying drawings wherein.

DESCRIPTION OF THE PREFERRED EMBODIMENT

Figure 1:
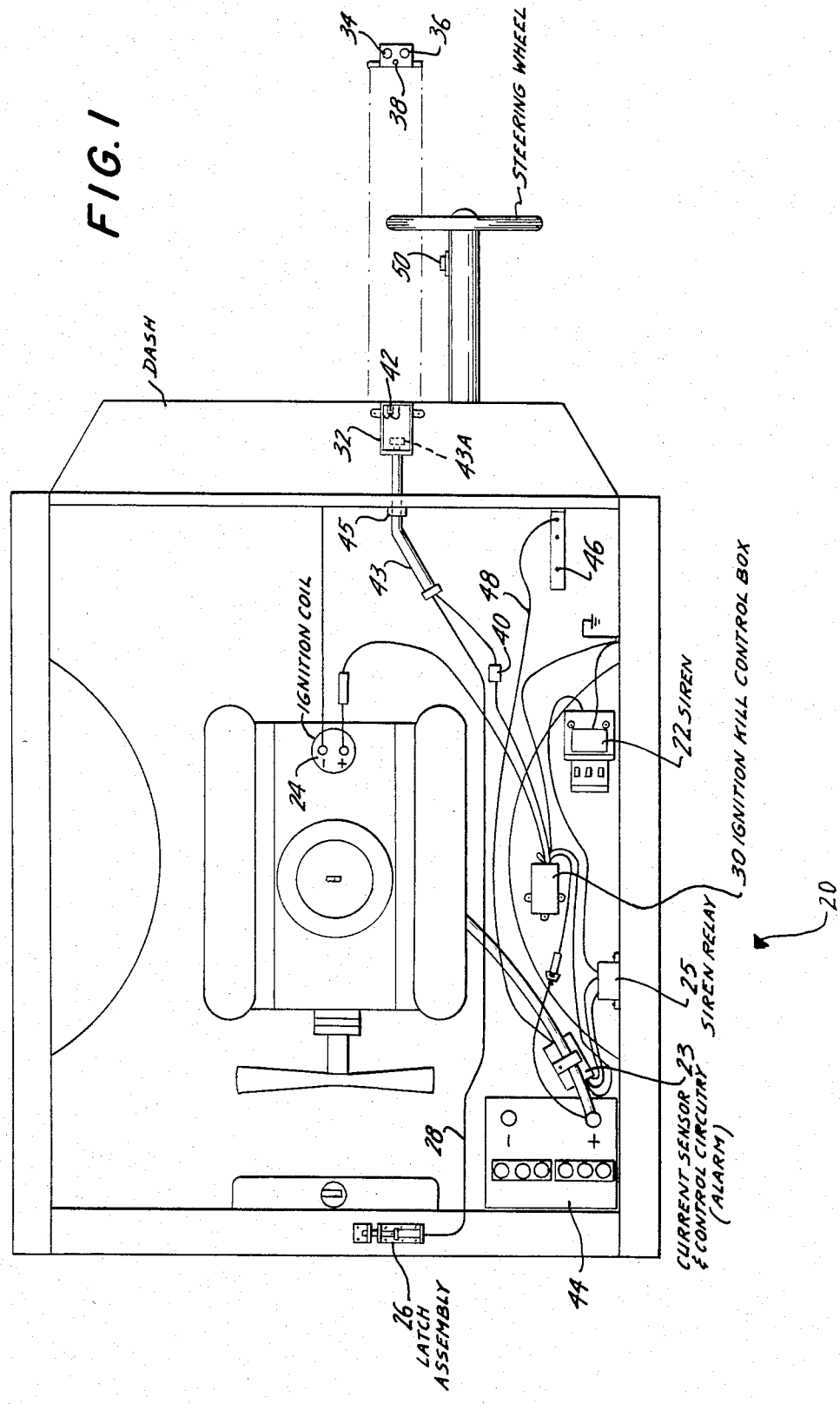
FIG. 1 is a stylized view of an automobile engine compartment and the firewall showing the mechanical layout of the hood-locking mechanism as well as the electrical layout of the ignition disabling circuit of the invention.

Referring now to FIG. 1, the stylized view of the automobile engine compartment and the firewall discloses the layout of the mechanical and electrical portion of the vehicular security system 20 of the invention. The system 20 comprises a siren 22, alarm control circuit assembly 23, siren relay 25, a hood latch 26, a Bowden type cable 28, a control box 30 containing the ignition disabling circuit, a housing 32 containing locks 34 and 36 for locking respectively the electrical and mechanical portions of the system 20, a lamp 38 disposed on the front face of the housing 32, and an electrical harness 40 comprising an electrical wire interconnecting the control box 30 and the lock 34. The lock 34 includes an electrical switch 42, which, along with the lamp 38, forms a part of the ignition disabling circuit within the box 30 to which it is coupled by the foregoing wires of the harness 40. The Bowden type cable 28 connects from the latch 26 to the lock 36 which holds the cable 28 in position for engagement or for disengagement of the latch 26 with the hood (not shown) of the vehicle. The cable 28 passes through a protective tube 43 passing through the firewall and having a flange 43A by which the end of the tube is secured within the housing 32. The tube 43 is fabricated of hardened steel to inhibit vandalism, and also serves as a protective conduit for wires of the harness 40. Power for the ignition disabling circuit is provided by a battery 44. Electrical connection between components of the ignition disabling circuit and the ignition coil 24 may be made to the terminals of the ignition coil 24. A clamp 45 is secured about the tube 43 at the firewall to prevent tampering as by an attempted pulling of the tube 43 throught the firewall.

In addition, a motion detector 46 is advantageously secured to the firewall for the protection of any movement of the car, as might occur in the event that a tire and wheel were being removed from the car by a thief. A harness 48 connects the detector 46 with the alarm control assembly 23 for activation and de-activation of a siren which is also connected to the assembly 23 via the relay 25. The assembly 23 is clamped to the positive battery cable, and includes well-known circuitry (not shown) of a current sensor that would be initiated by opening a door, a trunk, or turning on any lights etc. The siren relay 25 is also activated by the current sensor to turn on the siren in the event of an entry. This is in accordance with the setting of the switch lock 34, there being a delay (not shown) in the circuit to permit activation of the lock 34 upon entry to the vehicle. The current sensor is wired in series with the ignition disabling circuit so that when the latter is disarmed by closing switch 42 in lock 34, so too is the current sensor.

An ignition key 50 is utilized separately from the lock 34 and 36 for the starting and the running of the engine. The key 50 operates a standard ignition switch, to be described subsequently, which is coupled to the circuitry within the box 30. However, the ignition key 50, in and of itself, cannot start and run the engine, the lock 34 must first be operated to activate the circuit of the box 30 to permit use of the ignition coil 24 in the ignition circuit. However, upon the turning of the key 50 to the off position, even if the key 50 remains in the key slot (not shown) of the steering wheel housing, the circuit of the box 30 will automatically disable the ignition circuit by grounding a terminal of the ignition coil 24. Thereby the ignition circuit is disabled without the need of a positive act on the part of the driver of the vehicle to initiate such disablement. By simple turning off the ignition by means of key 50, the ignition coil becomes shorted to ground and the automobile cannot be operated until such time as the tubular key (not shown) is inserted into the lock 34 for enabling use of the ignition system. Alternatively, the tubular key can be inserted into the lock 36 for opening the hood whereby a failsafe switch may be used to bypass the disabling circuit as will be described subsequently.

Figure 2:
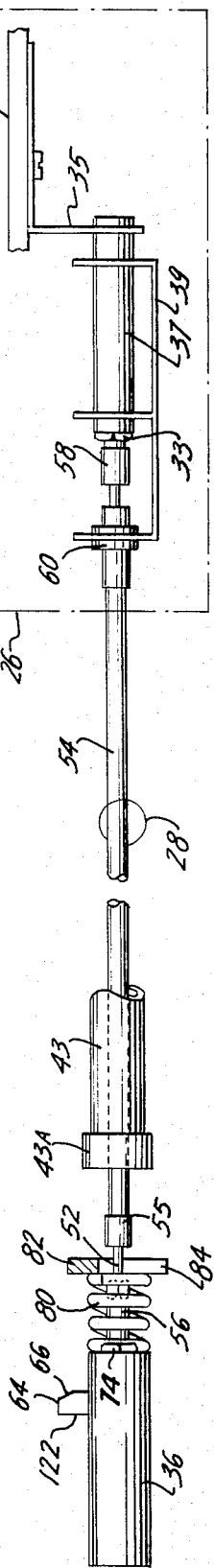
FIG. 2 shows an exemplary Bowden type cable for use in connecting the hood engagement device with the lock at the dash.

Referring now to FIG. 2, there is shown a detailed view of the cable 28, previously seen in FIG. 1. The cable 28 includes a central flexible rod 52 enclosed within a flexible sheath 54. The rod 52 is provided with end fittings 58 and 56 for engagement, respectively, with the latch 26 and the lock 36 of FIG. 1. A flange 60 is disposed on one end of the sheath 54 for engagement with the slide bolt bracket 39.

During installation of latch assembly 26, a locking nut 33 is threaded onto cable end 58. The cable end 58 would then have a slide bolt 37 threaded on and locked in place by a lock nut 33. The slide bracket 39 would be secured by means of screws (not shown) to the radiator brace (not shown), or any other integral part of the engine compartment of the vehicle. A hood bracket 35 would then be secured by means of screws to the hood 35A (FIG. 2), in a position that would allow the aperture in the hood bracket 35 (aperture not shown), to align with the slide bolt bracket 39. When the cable lock 36 is manually pushed inward, it in turn would move the central rod 52 outward (toward latch assembly 26), moving the slide bolt 37 through the aperture in the hood bracket 35. This would inhibit opening of the hood of the vehicle, so as to prevent tampering with the wiring for the ignition kill or alarm control circuitry.

Figure 3:
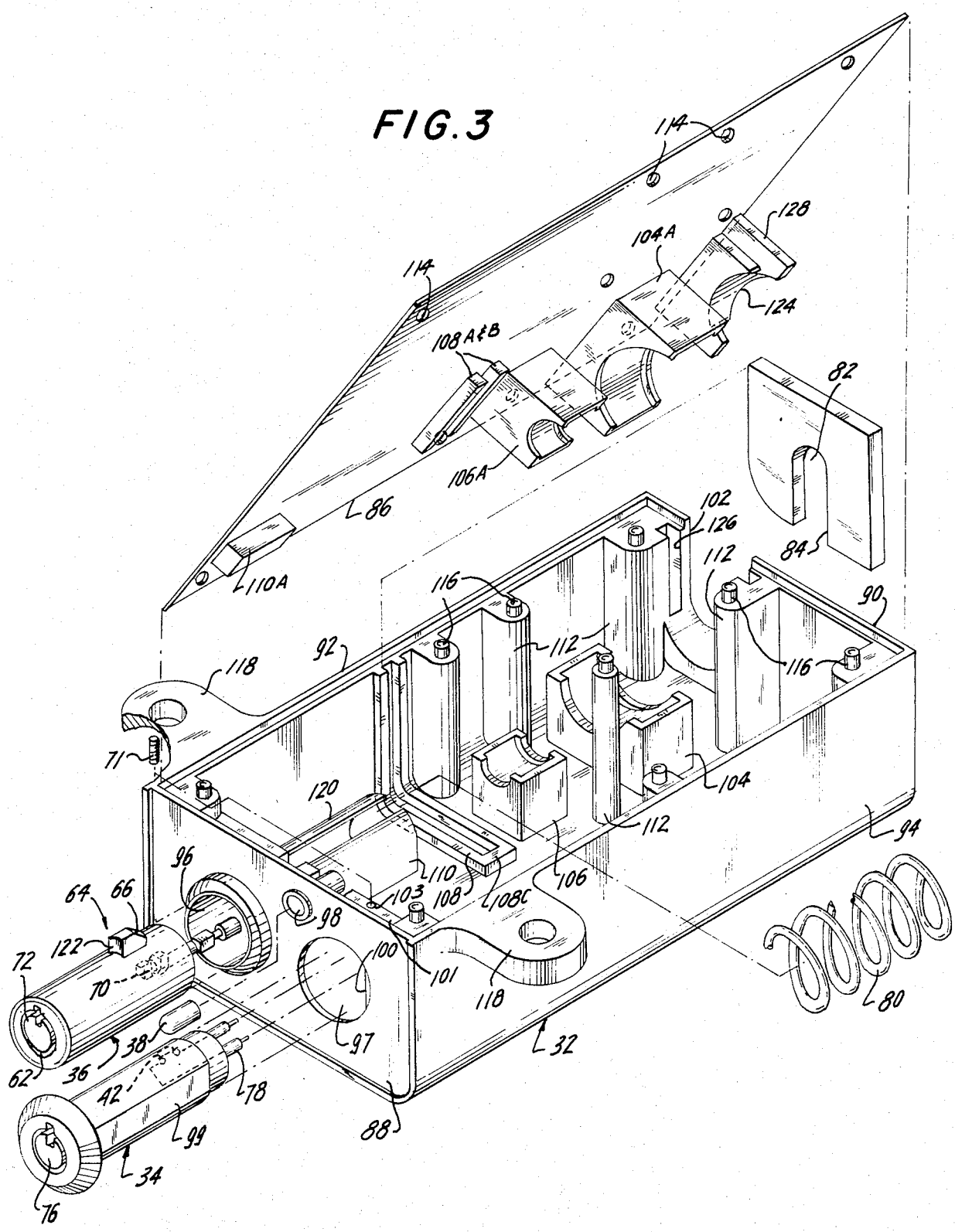
FIG. 3 shows a perspective view of a housing incorporating an exemplary cable lock and switch lock mounted therein; the view being exploded and partially cut-away to more clearly show structural details of the housing and its cover.

Referring now to FIG. 3, there is shown an exploded perspective view of the housing 32 including views of the cable lock 36 and the switch lock 34 of FIG. 1. The cable lock 36 is a generally cylindrical form and has a circular keyway 62 for receiving a tubular key (not shown). A bolt 64 having a chamfer 66 extends radially outward from the lock engagement within a keyway of the housing 32 as will be described subsequently. The chamfer 66 permits the lock 36 to be pushed inwardly into the housing 32 (FIG. 1) for advancing the cable 28 (FIGS. 1 and 2) for securing the hood latch 26. A socket 70 is provided in an end of the lock 36 for engagement with the end fitting 56 (FIG. 2) of the cable 28, the socket 70 being threaded for receiving the screw threads on the end of fitting 56 for securing the cable lock to the cable 28. A locking nut 74 (FIG. 2) is applied on the threaded end of end fitting 56 to secure the cable end into threaded hole 70 in the rear of cable lock 36. Rotation of a central member 72 by the aforementioned tubular key retracts the bolt 64 to permit the lock 36 to spring outwardly from the housing 32 (FIG. 1) in response to the force of a spring to be described subsequently, the output movement of the lock 36 advancing the cable 28 for release of the latch mechansim 26 (FIG. 1).

The switch lock 34 has a generally cylindrical configuration and is provided with a circular slot for engagement with a tubular key (not shown). The tubular key rotates a central member 76 for a momentary contact of the electrical switch 42 (shown in phantom in FIG. 3) for completion of an electrical circuit between the terminals 78 in the back end of the switch lock 34.

The housing 32 includes a helical spring 80 and a spring stop 82. The stop 82 is of planar form and has a cut-out 84 to allow cable 28 to pass through freely. The spring 80 and stop 82 are also shown in phantom view in FIG. 2 to disclose their positions relative to the cable 28. Thus, the spring 80 envelops the cable 28 and abuts the stop 82 and the lock 36.

The top of the housing 32 is closed by a cover 86, the housing 32 further comprising a front wall 88, a back wall 90, and side walls 92 and 94. The front wall 88, comprises an aperture 96 for receiving the cable lock 36, an aperture 97 for receiving the switch lock 34, and an aperture 98 for receiving the lamp 38 of FIG. 1. The outer casing of the switch lock 34 is restrained against rotation by a flat strip 99 which fits into a flat edge 100 of the aperture 97, and is secured into the housing 32 by a set screw 71. A socket 103 is provided in the thickened portion 101 of front wall 88. The socket 103 is threaded for receiving the set screw 71 to allow tightening against the casing of switch lock 34. The two apertures 96 and 97 are located within a thickened portion 101 of the front wall 88, the thickened portion 101 providing increased strength to the housing 32 for protection from vandalism. The back wall 90 includes a rear opening 102 for passage of the cable 28 and guide tube 43 (FIGS. 1 and 2) between the cable lock 36 and the hood latch mechanism 26.

Within the housing 32, upon the floor thereof, are located a rear guide tube 104, and a forward cable guide 106 with corresponding guides 104A and 106A located on the interior side of the housing cover 86 for locating and securing cable 28 and guide tube 43, The guide tube 43 is retained in the tube guide 104 and 104A by clamping around tube flange 43A (FIG. 2). This prevents its removal by any means, but will allow guide tube 43 to rotate as may be necessary during installation into a motor vehicle. Cable 28 is retained in forward cable guides 106 and 106A by clamping around retainer ring 55 (FIG. 2), which is affixed to cable 28. This will inhibit removal of cable 28 and control the amount of movement of the central flexible rod 52. A pair of bosses 108 on the floor of the housing 32 and corresponding bosses 108A and 108B, respectively, on the cover 86 and a side wall 92 engage the edges of the spring stop 82, and thereby position the stop 82 at its requisite distance from the front wall 88 for restraining the spring 80. The end of the bosses 108 are joined together at 108C to engage a lower corner of the stop 82 so as to position the stop 82 against the side wall 92. In order to provide for the reciprocating movement of the cable lock 36 through the aperture 96, a slide 110 is positioned on the floor of the housing 32 with a small section of corresponding slide 110A located on the inner surface of the cover 86.

In order to secure the cover 86 to the housing 32, posts 112 are provided along the interior surfaces of the housing 32. The posts 112 include rivet posts 116 which pass through holes 114 in cover 86. The rivet posts 116 are orbitally reamed in final assembly to tighten the cover 86 against the housing 32. The riveting of posts 116 is to prevent tampering by a potential thief. The housing 32 is conveniently mounted to the dash board of a motor vehicle by means of mounting ears 118 extending outwardly from the side walls 92 and 94.

The slide 110 incorporates a keyway 120 for receiving the bolt 64 of the cable lock 36. The bolt 64 is slidably guided within the key 120. The keyway 120 prevents rotation of the lock 36 and, thereby, constrains its movement to translation only. The slide 110A of the cover 86 depresses bolt 64 as lock 36 is manually pushed into housing 32 to lock latch 26 (FIG. 1). In the lock position, bolt 64 again advances radially outward from lock 36 such that the back edge 122 abuts against the end of the slide 110A so as to retain the lock 36 within the housing 32 against the force of the spring 80. Upon the unlocking of the lock 36 with the aforementioned tubular key, bolt 64 is retracted inwardly into the lock 36 and away from the slide 110A, thereby permitting the spring 80 to push the lock 36 outwardly through the aperture 96 in the front wall 88 of the housing.

The rear opening 102 of the housing 32 is partially closed off by an ear 124 extending downwardly from the cover 86 for securing the protective tube 43. In order to strengthen the back wall 90 at the site of the opening 102, two of the posts 112 are placed at the side of the opening 102 to provide a thickened portion of the back wall 90. Channels 126 are set within the thickened portion of the back wall 90 along opposed sides of the opening 102 for engagement with rails 128 which extend outwardly from the ear 124. Upon emplacement of the cover 86 on the body of the housing 32, the rails 128 slide within the channels 126 to strengthen the interface between the ear 124 and the back wall 90 to add security at the entry point in housing 32 of guide 43.

Figure 4:
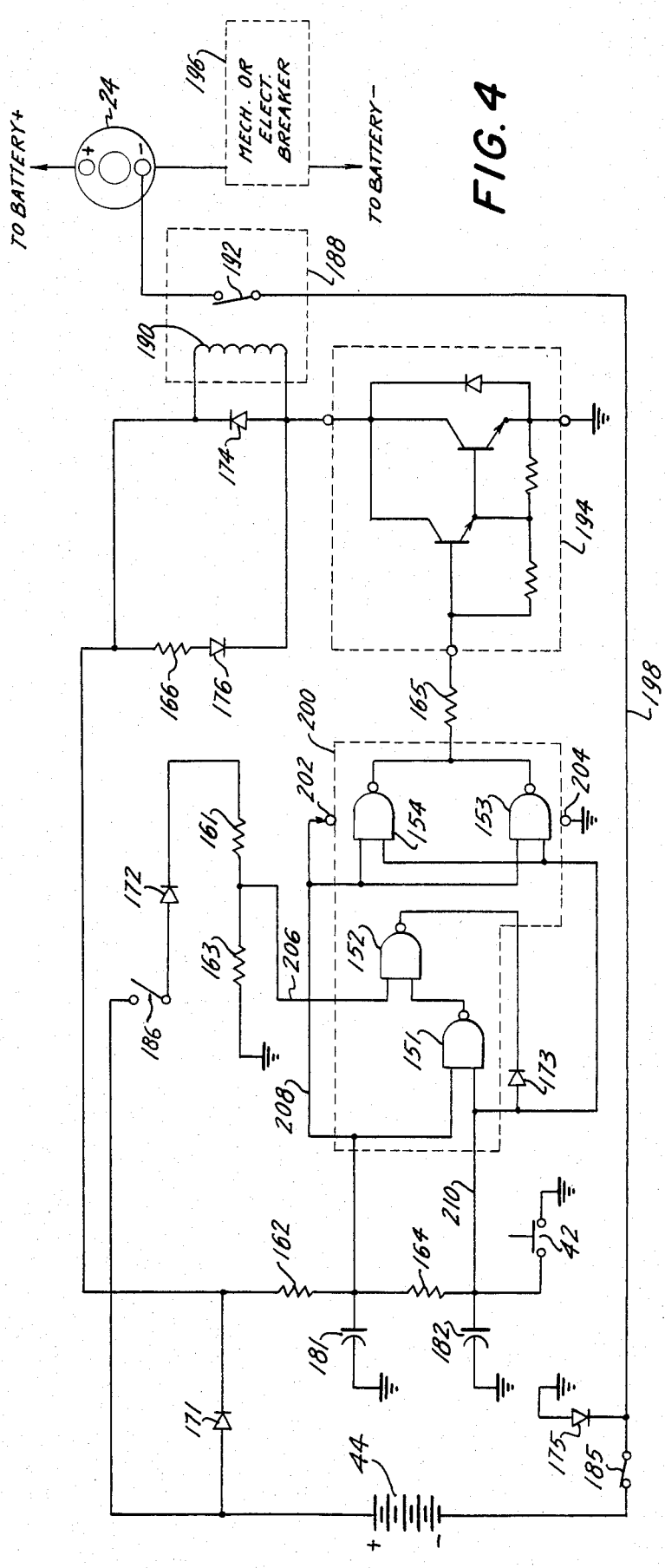
FIG. 4 is a schematic diagram of an ignition disable circuit, or "kill" circuit, having a logic lock-up feature in accordance with the invention.

Referring now to FIG. 4, there is shown the schematic diagram of the disabling circuit 150 for the ignition system of the motor vehicle, the circuit 150 being located in the control box 30 of FIG. 1. The circuit 150 comprises four NAND gates 151, 152, 153 and 154, six resistors 161, 162, 163, 164, 165 and 166, six diodes 171, 172, 173, 174, 175 and 176 of which the latter is a light-emitting diode, two capacitors 181 and 182, switch 185 and ignition switch 186, and the aforementioned switch 42 (FIG. 1) contained within the switch lock 34. The circuit 150 further comprises a relay 188 having a coil 190 and contact 192. The coil 190 is energized by a transistor circuit 194 of conventional amplifier configuration.

The ignition coil 24 is connected in conventional fashion in series with a mechanical or electrical breaker circuit 196 between the positive and the negative terminals of the battery 44. The negative terminal of the battery 44 is grounded in accordance with the usual construction of motor vehicles. In accordance with a feature of the invention, a bypass circuit 198 comprising the contact 192 and the switch 185 is connected in parallel with the breaker circuit 196 to short out the breaker circuit 196 for disabling the ignition, thereby preventing theft of the motor vehicle. The bypass circuit 198 is broken electronically by activation of the relay 188 to permit operation of the ignition. Alternatively, as a safety feature in the event of malfunction of the disabling circuit 150, the switch 185 is operated manually to override the disabling circuit 150 to permit operation of the ignition and the motor vehicle. The switch 185 is advantageously located on the control box 30 (FIG. 1) protected from vandals by the locked hood of the engine compartment.

Power for energization of the disabling circuit 150 and the relay 188 is provided by the battery 44 through the diode 175 which is serially connected between the battery 44 and the components of the disabling circuit 150. The diode 175 also protects the disabling circuit 150 by filtering out any negative electrical spike voltage which might otherwise develop. Also, it is noted that the override switch 185 is coupled serially between the diode 175 and the negative terminal of the battery 44 so that, upon opening the switch 185 in the override mode, the disabling circuit 150 is completely deenergized.

The four NAND gates 151–154 are provided as an integrated circuit module 200, such as the commercialy available type 4011B, with power being coupled thereto via terminals 202 and 204, the terminal 202 being connected to positive potential while the terminal 204 is grounded. The electric power for the module 200 is coupled from the battery 44 via the diodes 171 and 175, the resistors 162 and 164, the capacitors 181 and 182, and the switch 185. The resistors 162 and 164 are serially connected via the diode 171 to the positive terminal of the battery 44, while the capacitor 181 is connected from the junction of the resistors 162 and 164 to ground, thereby filtering the current provided to the module 200. The other end of the resistor 164 is connected to ground via the capacitor 182 and the switch 42, the switch 42 being in parallel with the capacitor 182, to form a timing circuit which is activated by the closing of the switch 42 and which has a time constant based on the charging time of the capacitor 182 via the resistor 164.

The circuitry of the module 200 is connected via the resistor 165 to the transistor circuit 194 for activating the circuit 194 to drive the relay 188. The circuit 194 comprises two transistors, two resistors, and a diode which are connected in a well-known manner to provide an amplifier circuit which drives current through the coil 190 in response to current applied at the input terminal of the circuit 194 via the resistor 165. The current in the resistor 165 is present during a logic 1 signal at the output terminal of the module circuit, a relatively high voltage approximating the battery voltage. The current in the resistor 165 terminates upon the presence of a logic 0 signal, a relatively low voltage of approximately zero volts, at the output terminal of the module circuit.

Current is also coupled to the circuit of the module 200 from the positive terminal of the battery 44 via the serial connection of the switch 186, the diode 172 and the resistor 161. The switch 186 is the ignition switch and is, accordingly, closed by the ignition key during operation of the motor vehicle. The serial connection of the resistors 161 and 163 provide a voltage divider circuit for applying a logic 1 signal from the junction of the two resistors 161 and 163 via line 206 to an input terminal of the NAND gate 152 upon closure of the ignition switch 186.

The junction of the resistors 162 and 164 is also utilized as a source of a logic 1 signal which is coupled via line 208 to one input terminal in each of the gates 151, 153 and 154. The signal coupled from the junction of the capacitor 182 and the resistor 164 via line 210 to the second input terminal of the gate 151 is of variable amplitude depending on the state of charge of the capacitor 182. The amplitude of the signal on line 210 is also dependent on the connection of the diode 173 to the output terminal of the gate 152, this connection constituting a lock-up circuit whereby the amplitude of the voltage at the line 210 is held at the low, logic 0, level when the gate 152 outputs a logic 0.

In operation, therefore, the driver of the vehicle first inserts the tubular key into the switch lock 34 to close the switch 42 momentarily, and thereby reduce the voltage at line 210 to zero. The closure of the switch 42 disarms the circuit 150 so as to permit the starting of the engine upon the subsequent closure of the ignition switch 186 with the ignition key. Upon release of the switch 42, the voltage on line 210 would rise back to the value of the logic 1 if the ignition switch 186 is open, the rise time depending on the foregoing charge time of the capacitor 182. However, if the ignition switch 186 is closed prior to the charging of the capacitor 182, then the line 210 inputs a logic 0 to the gate 151 while the line 208 inputs a logic 1 to the gates 151, 153 and 154, while the line 206 inputs a logic 1 to the gate 152. With the foregoing signal inputs, the gate 151 outputs a logic 1 to the second input terminal of the gate 152, the gate 152 outputs a logic 0, and the gates 153 and 154 which are wired in parallel output a logic 1 which drives the aforementioned current through the resistor 165. The line 210, which connects with the second input terminal of the gate 151 and the diode 173, also connects with the second input terminal in each of the gates 153 and 154. The lock-up function of the diode 173 thus keeps the second input terminal in each of the gates 151, 153 and 154 at logic 0 even after the disarming switch 42 is reopened. Upon the opening of the switch 186 for turning off the ignition, the voltage at the line 206 drops and the gate 152 outputs a logic 1, thereby discontinuing the lock-up function. Thereupon, the voltage at line 210 rises with the recharging of the capacitor 182 to arm the circuit 150 and prevent unauthorized use of the motor vehicle.

The light-emitting diode 176 is serially connected with the resistor 166 for limiting the current in the diode 176 to provide the desired amount of brightness in a well-known manner. The diode 174 is connected across the terminals of the coil 190 to inhibit the generation of any voltage spike during the de-energizing the coil 190. The series circuit of the resistor 166 and the diode 176 is also connected in parallel with the coil 190. Thereby, upon activation of the relay 188 to open the contact 192 in the disarming of the circuit 150, current also flows from the positive terminal of the battery 44 through the diode 176 to produce the light on the front of the housing 32 indicating that the circuit 150 is disarmed. Subsequently, when the ignition is turned off the circuit 150 is armed, the coil 24 is grounded and the light from the diode 176 is extinguished.

Typical component values for the case of a twelve volt battery are as follows. The resistors 161 through 166 have values, respectively, of 3,300 ohms, 220 ohm, 10,000 ohms, 330,000 ohms, 3,300 ohms and 680 ohms. The diodes 171 and 175 are type 1N4001. The diodes 172 and 173 are type 1N 4148, and the diode 174 is type 1N4001. The capacitor 181 has a value of 0.01 microfarad, and the capacitor 182 has a value of 220 microfarad to provide a charging time of at least several seconds.

It is to be understood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed:

1. The security system for a vehicle having an engine compartment with an engine and ignition contained therein, a hood covering for the engine compartment, and an ignition switch for operation of the ignition and the engine, the system comprising:
   a. a hood latch;
   b. ignition disabling means;
   c. lock means for operating said hood latch;
   d. switch means for releasing said disabling means to permit operation of the ignition, said disabling means being in circuit with said ignition switch to reinstitute a disabling of said ignition upon the turning off of said ignition switch;
   e. a tamper resistant housing enclosing said lock means and said switch means to permit operation of said lock means and said switch means; and wherein
   f. said housing comprises a front wall, a back wall, a bottom wall, a top wall configured as a cover of said housing, and sidewalls joining the front wall and the back wall and extending from said bottom wall to said top wall, a lock of said lock means being disposed in said front wall, and a switch of said switch means being disposed in said front wall alongside said lock of said lock means;
   g. said lock means comprising a cable interconnecting said lock with said hood latch, said cable being coupled to said lock at a location within said housing, said security system further comprising a tube extending through said back wall of said housing and entering into said engine compartment, said tube being positioned for receiving said cable within said housing to provide a secure passage for said cable from said housing and into said engine compartment;
   h. said disabling means including a lock-up circuit responsive to the joint occurrence of an electric current from said ignition switch and from said switch means, said switch means including an electrical conductor passing through said housing and through said tube and into said engine compartment for connecting the switch of said switch means with said lock-up circuit, said tube providing secure passaage for said electrical conductor from said housing to said engine compartment;
   i. said housing including a guide disposed within the housing, a front end of said tube being rotatably secured within said housing by said guide, the front end of said tube having a flange for engagement with said guide to prevent extraction of said tube from said housing while permitting rotation of said tube relative to said housing to facilitate installation of said housing and said tube within said vehicle;

j. said lock means including a slide extending inwardly from said front wall to permit displacement of said lock in a direction along an axis of said cable, thereby to impart longitudinal motion to said cable for locking and locking said hood latch, said guide extending between said bottom wall and said cover with a bottom portion of said guide connecting with said bottom wall and a top portion of said guide connecting with said cover to permit assembly of said tube to said housing, and a portion of said slide being located on said cover to permit assembly of said lock to said housing; and wherein k. said disabling means includes a relay having a contact connected in parallel connection with breaker apparatus of said ignition for bypassing the breaker apparatus, said relay being driven by said lockup circuit, said lockup circuit having a first input terminal and a second input terminal, means in circuit with said ignition switch for applying a voltage representing a logic level to said first terminal, means in circuit with said switch of said switch means for applying a variable voltage as a logic level to said second input terminal, said variable voltage means including a resistor-capacitor circuit allowing the voltage level to drop during a discharge of said capacitor with a predetermined time constant, a set of interconnected logic gate elements connecting with said first and said second input terminals and providing an output signal for operation of said relay; and a diode interconnecting an output terminal of one of said logic gates with said variable voltage level at said second input terminal to provide a lockup function for retaining said relay in a state of energization during closure of said ignition switch, and subsequent to a momentary closure of said switch of said switch means.

2. A system according to claim 1, wherein said disabling means includes an override switch for breaking said parallel connection of said relay contact, and is connected to said lock-up circuit for simultaneously disconnecting electric power thereto.

3. A system according to claim 2 further comprising an indicator light disposed in said housing, said light being energized by said lock-up circuit during a locking-up of said lock-up circuit.

4. A system according to claim 1 wherein said resistor-capacitor circuit serves as a timing circuit for designating an interval of time during which said disabling means is released by said switch means.

5. A system according to claims 2 or 4 wherein the disabling of said ignition is accommplished by grounding an electrical spark producing circuit in said ignition.

6. A system according to claim 5 wherein said lock means and said switch means are configured for receiving a tubular key for operation of said locking and said switch means.

7. A system according to claim 6 wherein said switch means is rotatable about an axis thereof for producing a momentary electrical contact independently of a displacement of said lock means.

8. A security system according to claim 1, wherein said disabling circuit is disarmed by a momentary operation of said switch means, said lock-up circuit holding said disabling means in a state of disarm until the ignition is turned off by said ignition switch.

9. A security system according to claim 8 wherein the disabling of said ignition circuit is accomplished by a shorting of an ignition coil of said ignition circuit.

10. A security system according to claim 4 wherein said timing circuit holds said disabling means via said logic gate elements in a state of disarm during a predetermined interval of time during which said ignition switch may be operated for starting and running the engine.

11. A security system according to claim 1 wherein said relay contact is serially connected between a terminal of an ignition coil of said ignition and ground, said indicator light being commonly energized with said relay for illumination during a state of disarm when a ground connection between said coil and ground is broken by said contact.

12. A security system according to claim 1 or claim 11 further comprising motion detector means, said housing and said motion detector means being rigidly secured to said vehicle to permit motion of said housing and of said vehicle to be detected by said motion detection means.

13. A security system according to claim 12 further comprising an alarm circuit coupled to said motion detection means for activating an alarm upon the detection of vehicular motion.

14. A security system according to claim 13 further comprising a current sensor coupled to said alarm circuit to provide for activation of an alarm upon the detection of the flow of an electric current within said vehicle.

* * * * *